(12) United States Patent
Kim et al.

(10) Patent No.: US 11,970,155 B2
(45) Date of Patent: Apr. 30, 2024

(54) APPARATUS AND METHOD FOR IMPROVING TURNING PERFORMANCE OF VEHICLE

(71) Applicants: HYUNDAI MOTOR COMPANY, Seoul (KR); Kia Corporation, Seoul (KR)

(72) Inventors: Seung Ki Kim, Suwon-si (KR); Sang Ho Lee, Seoul (KR); Sung Wook Hwang, Seoul (KR); Jae Il Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 170 days.

(21) Appl. No.: 17/398,420

(22) Filed: Aug. 10, 2021

(65) Prior Publication Data

US 2022/0097683 A1   Mar. 31, 2022

(30) Foreign Application Priority Data

Sep. 28, 2020  (KR) .................. 10-2020-0126260

(51) Int. Cl.
*B60W 30/045*   (2012.01)
*B60W 10/18*    (2012.01)
*B60W 40/107*   (2012.01)
*B60W 40/109*   (2012.01)

(52) U.S. Cl.
CPC .......... *B60W 30/045* (2013.01); *B60W 10/18* (2013.01); *B60W 40/107* (2013.01); *B60W 40/109* (2013.01); *B60W 2520/14* (2013.01); *B60W 2520/26* (2013.01); *B60W 2520/28* (2013.01); *B60W 2540/10* (2013.01); *B60W 2710/18* (2013.01)

(58) Field of Classification Search
CPC .. B60W 30/045; B60W 10/18; B60W 40/107; B60W 40/109; B60W 2520/14; B60W 2520/26; B60W 2520/28; B60W 2540/10; B60W 2710/18
See application file for complete search history.

(56) References Cited

U.S. PATENT DOCUMENTS

2004/0046448 A1* 3/2004 Brown ...................... B60T 8/24
                                                              903/910
2005/0231032 A1* 10/2005 Frey ...................... B60W 50/00
                                                              303/146

(Continued)

*Primary Examiner* — Jaime Figueroa
*Assistant Examiner* — Jamal A Shah
(74) *Attorney, Agent, or Firm* — Lempia Summerfield Katz LLC

(57) ABSTRACT

An apparatus for improving turning performance of a vehicle includes: a turning characteristic detection module configured to detect a turning situation based on vehicle information obtained from at least one sensor and to calculate a required driving force to be implemented in the vehicle for a turning motion; a driving force estimation module configured to estimate a limited driving force applicable to a drive wheel; and a turning characteristic control module configured to control and apply a braking force corresponding to a difference between the required driving force and the limited driving force to a motor to inhibit a wheel slip, when the required driving force is greater than the limited driving force.

19 Claims, 11 Drawing Sheets

(56) References Cited

U.S. PATENT DOCUMENTS

| | | | |
|---|---|---|---|
| 2011/0125382 A1* | 5/2011 | Bonfigt | B60T 8/175 |
| | | | 701/70 |
| 2012/0253620 A1* | 10/2012 | Handa | B60K 23/0808 |
| | | | 701/69 |
| 2018/0339699 A1* | 11/2018 | Matsuda | B60W 30/02 |
| 2019/0126976 A1* | 5/2019 | Murayama | B60W 40/114 |
| 2020/0339135 A1* | 10/2020 | Kasaiezadeh Mahabadi | |
| | | | B60W 30/045 |

* cited by examiner

APPARATUS AND METHOD FOR IMPROVING TURNING PERFORMANCE OF VEHICLE

CROSS-REFERENCE TO RELATED APPLICATION

This application claims priority to and the benefit of Korean Patent Application No. 10-2020-0126260, filed on Sep. 28, 2020, the entire contents of which are incorporated herein by reference.

FIELD

The present disclosure relates to an apparatus and a method for controlling a wheel slip of a drive wheel of a vehicle.

BACKGROUND

The statements in this section merely provide background information related to the present disclosure and may not constitute prior art.

In general, in an electric vehicle (EV) which is driven by electric power generated by a motor as well as an engine, a large driving torque undesirably occurs in a power train of the vehicle, which is performing a turning motion, and a wheel slip occurs in a drive wheel, which is a tire of an axle that receives a driving force.

Thus, to enhance turning performance of the vehicle in an existing technology, an electronic stability control (ESC) performs partial braking and additionally applies a braking force to a wheel that slips, thus inhibiting an understeer phenomenon from being generated while both of a lateral force and a driving force of the tire are reduced due to the wheel slip.

However, the turning performance improvement by the partial braking or the like in the ESC in the existing technology is accomplished only when the vehicle starts.

Furthermore, because the slip is detected after the slip occurs in the drive wheel or the like and control is performed in the existing turning performance improvement, a response to improve a turning motion is degraded.

Particularly, when a front-wheel drive vehicle or the like makes a sharp turn while accelerating or drives on a hill, the normal force at the driven inner wheel is reduced as the load of the vehicle moves to the outer wheel and it is difficult to inhibit the wheel slip from occurring due to it.

Furthermore, as both of a lateral force and a driving force at the driven inner wheel are reduced due to the occurrence of the wheel slip, it is difficult to avoid the occurrence of an understeer phenomenon.

SUMMARY

The present disclosure has been made to solve the above-mentioned problems occurring in the prior art while advantages achieved by the prior art are maintained intact.

An aspect of the present disclosure provides an apparatus and method for improving turning performance of a vehicle to control an electric motor to additionally generate a braking force corresponding to a difference between a required driving force of a driver and a limited driving force applicable to a drive wheel which is performing a turning motion to proactively inhibit the vehicle from causing a wheel slip and being in an understeer state as the driving force greater than or equal to the limited driving force is applied to the drive wheel.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for improving turning performance of a vehicle may include a turning characteristic detection module that detects a turning situation based on vehicle information obtained from a sensor and calculate a required driving force to be implemented in the vehicle for a turning motion, a driving force estimation module that estimates a limited driving force applicable to a drive wheel which is performing the turning motion, and a turning characteristic control module that controls to apply a braking force corresponding to a difference between the required driving force and the limited driving force to an electric motor to inhibit a wheel slip, when the required driving force is greater than the limited driving force.

The turning characteristic detection module may include a turn situation detecting device that determines whether the vehicle is in a turning motion state using vehicle information about at least one of a steering torque, a steering angle, a yaw rate, or a lateral acceleration obtained from various sensors provided in the vehicle and a required driving force calculating device that identifies the required driving force to be implemented in the vehicle using vehicle information about at least one of an accelerator pedal signal manipulated by a driver who wants to perform the turning motion, a wheel speed, or a revolution per minute (RPM) of an engine/motor.

The required driving force calculating device may compare the accelerator pedal signal manipulated to generate a driving force for the turning motion, the wheel speed, and the RPM of the engine/motor, the wheel speed and the RPM being caused by the accelerator pedal signal, with data on a previously constructed map to identify the required driving force to be implemented to perform the turning motion.

The driving force estimation module may include a maximum driving force calculating device that estimates a normal force applied to a drive wheel of the vehicle which is performing the turning motion and calculates a maximum driving force in the drive wheel using the normal force.

The maximum driving force calculating device may estimate the normal force currently applied to the drive wheel based on data obtained based on specifications of the vehicle and a longitudinal acceleration and a lateral acceleration of the vehicle which is performing the turning motion.

The maximum driving force calculating device may calculate a radius of the Kamm's circle, the radius being calculated by multiplying the normal force by a friction coefficient, as the maximum driving force capable of being implemented while the normal force is applied to the ground.

The driving force estimation module may include a tire lateral force estimating device that estimates a lateral force applied to the drive wheel using a lateral acceleration and a yaw rate obtained by the turning characteristic detection module based on the normal force and a limited driving force estimating device that estimates a magnitude of the limited driving force capable of being actually implemented in the drive wheel based on a maximum driving force in the drive wheel and a lateral force currently applied to the drive wheel.

The turning characteristic control module may include a feedforward controller that compares a magnitude of the required driving force with a magnitude of the limited driving force and controls braking of the electric motor to apply a feedforward braking force corresponding to a difference between the required driving force and the limited driving force, when the required driving force is greater than the limited driving force.

The turning characteristic control module may further include a partial braking linkage controller that controls an electronic stability control (ESC) to perform partial braking and additionally apply a braking force to a wheel which slips, when occurrence of the wheel slip is predicted at an inner wheel in the drive wheel because the required driving force is greater than the limited driving force.

The turning characteristic control module may include a feedback controller that obtains a front wheel speed and a rear wheel speed transmitted from a wheel speed sensor provided in the vehicle to calculate a slip ratio and additionally generates a feedback braking force proportional to a magnitude of the slip ratio, when the slip ratio is greater than or equal to a certain value.

According to another aspect of the present disclosure, a method for improving turning performance of a vehicle may include detecting a turning situation based on vehicle information obtained from a sensor and calculating a required driving force to be implemented in the vehicle for a turning motion, estimating a normal force and a lateral force applied to a tire based on the vehicle information and estimating a limited driving force applicable to a drive wheel which is performing the turning motion, and controlling to apply a braking force corresponding to a difference between the required driving force and the limited driving force to an electric motor to inhibit a wheel slip, when the required driving force is greater than the limited driving force.

The calculating of the required driving force may include determining whether the vehicle is in a turning motion state using vehicle information about at least one of a steering torque, a steering angle, a yaw rate, or a lateral acceleration obtained from various sensors provided in the vehicle and identifying the required driving force to be implemented in the vehicle using vehicle information about at least one of an accelerator pedal signal manipulated by a driver, a wheel speed, or a revolution per minute (RPM) of an engine/motor.

The identifying of the required driving force may be to compare the accelerator pedal signal manipulated to generate a driving force for the turning motion, the wheel speed, and the RPM of the engine/motor, the wheel speed and the RPM being caused by the accelerator pedal signal, with data on a previously constructed map to identify the required driving force to be implemented for the turning motion by the driver.

The estimating of the limited driving force may include estimating a normal force applied to the drive wheel of the vehicle which is performing the turning motion based on the vehicle information and values of vehicle specifications and calculating a maximum driving force in the drive wheel based on the normal force.

The calculating of the maximum driving force may be to calculate a radius of the Kamm's circle, the radius being calculated by multiplying the normal force by a friction coefficient, as the maximum driving force capable of being implemented while the normal force is applied to the ground.

The estimating of the limited driving force may further include estimating a lateral force applied in a lateral direction to the drive wheel using a lateral acceleration and a yaw rate obtained from the vehicle information based on the normal force and estimating a magnitude of the limited driving force capable of being actually implemented in the drive wheel based on the maximum driving force in the drive wheel and the lateral force currently applied to the drive wheel.

The estimating of the magnitude of the limited driving force may be to estimate a component applied in a longitudinal direction in the maximum driving force as the limited driving force capable of being implemented in the drive wheel within a range of the maximum driving force.

The estimating of the magnitude of the limited driving force may be to compare maximum driving forces respectively calculated for a left tire and a right tire of the drive wheels and estimate the limited driving force for a tire where a maximum driving force having a smaller magnitude is calculated.

The controlling may include comparing a magnitude of the required driving force with a magnitude of the limited driving force and controlling braking of the electric motor to generate a feedforward braking force corresponding to a difference between the required driving force and the limited driving force, when the required driving force is greater than the limited driving force.

The controlling may include controlling an electronic stability control (ESC) to perform partial braking and additionally apply a braking force to a wheel which slips, when occurrence of the wheel slip is predicted at an inner wheel in the drive wheel because the required driving force is greater than the limited driving force.

The controlling may include obtaining a front wheel speed and a rear wheel speed transmitted from a wheel speed sensor provided in the vehicle to calculate a slip ratio and control braking of the electric motor to additionally generate a feedback braking force proportional to a magnitude of the slip ratio, when the slip ratio is greater than or equal to a certain value.

The controlling of the braking of the electric motor may be to calculate slip ratios for a left tire and a right tire in calculating the slip ratio based on the front wheel speed and the rear wheel speed and generate the feedback braking force based on a slip ratio indicating a larger value.

DRAWINGS

In order that the disclosure may be well understood, there will now be described various forms thereof, given by way of example, reference being made to the accompanying drawings, in which.

Figure 1:
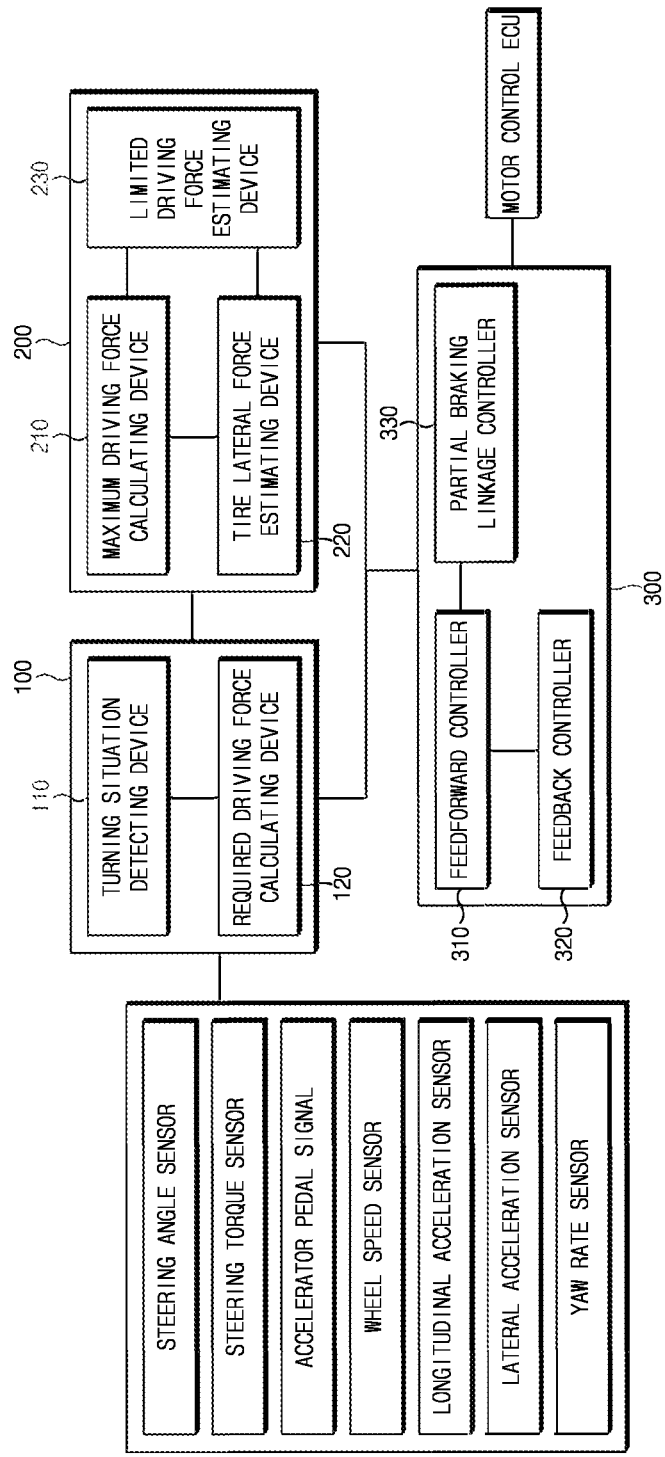
FIG. 1 is a block diagram illustrating a configuration of an apparatus for improving turning performance of a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary form of the present disclosure, a detailed description of well-known features or functions will be omitted.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains.

Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various forms of the present disclosure will be described in detail with reference to FIGS. 1 to 11.

Figure 2:
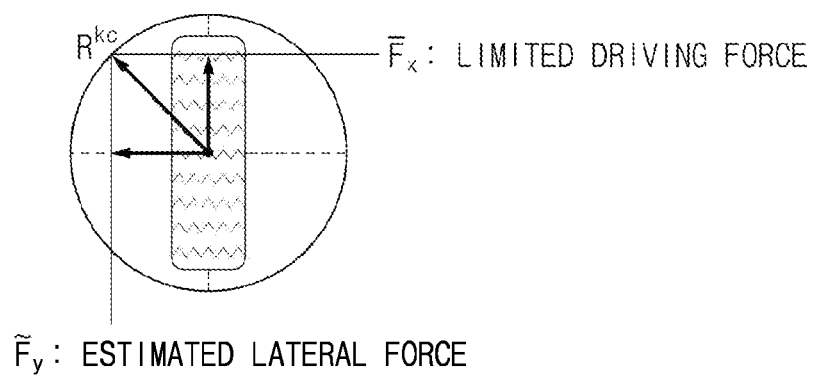
FIG. 2 is a plan view illustrating a relationship of a force applied to a drive wheel according to one form of the present disclosure.
Figure 3:
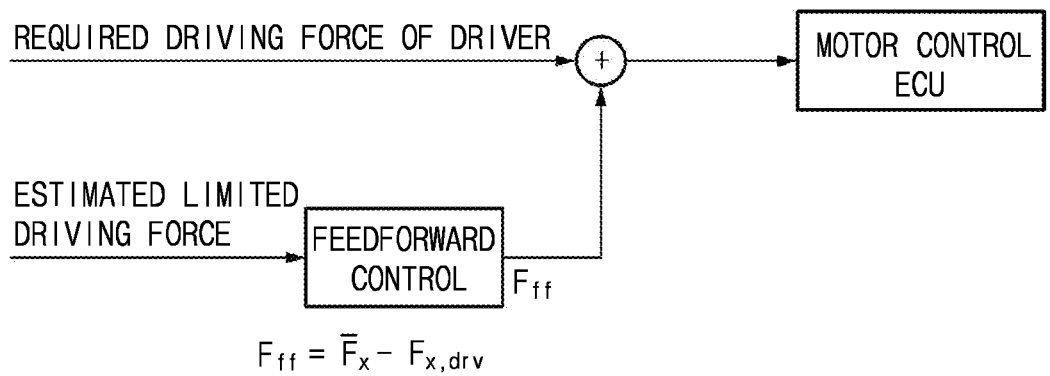
FIG. 3 is a conceptual diagram illustrating that feedforward control is performed according to one form of the present disclosure.
Figure 4:
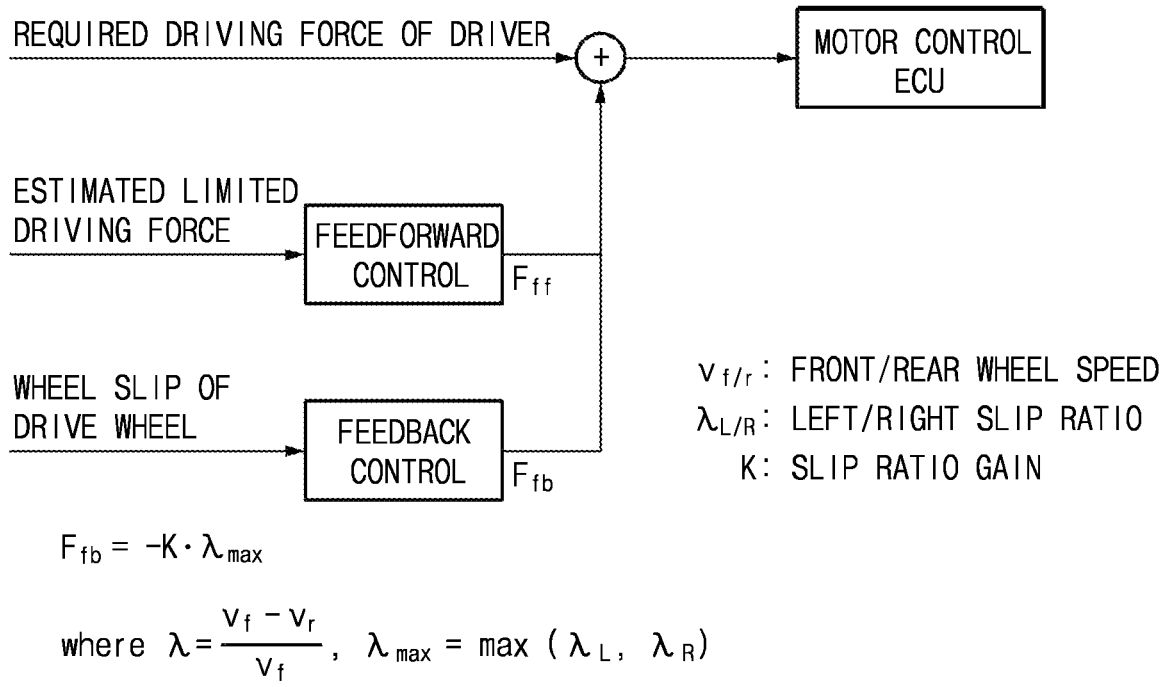
FIG. 4 is a conceptual diagram illustrating that feedback control is performed according to one form of the present disclosure.
Figures 5A, 5B:
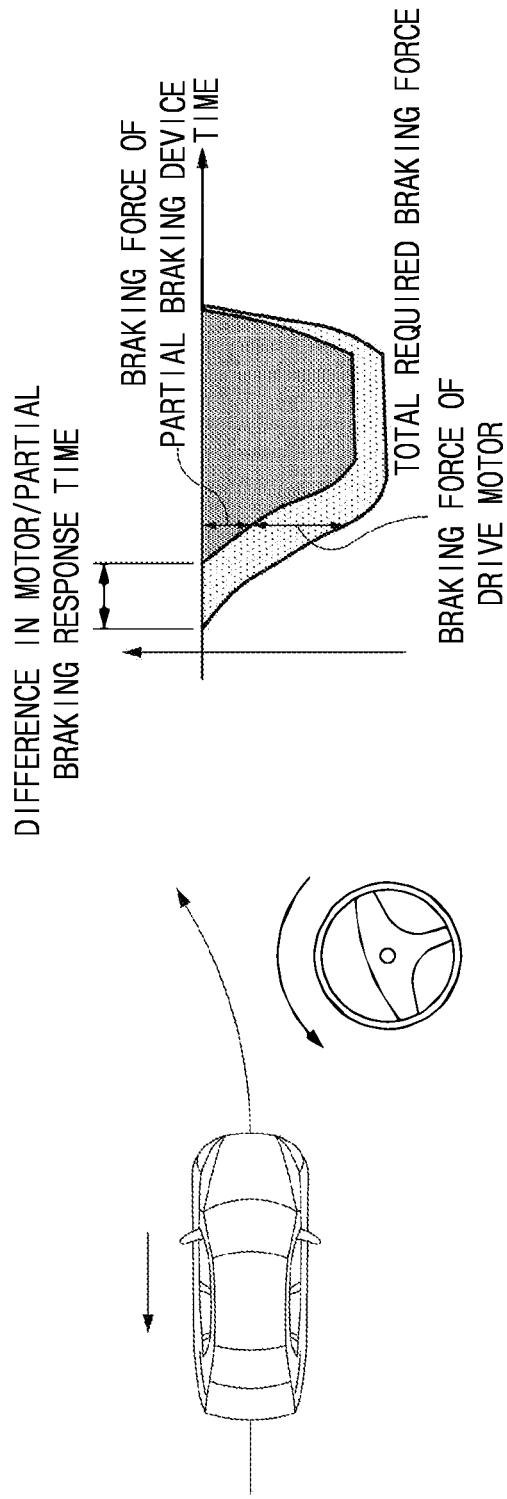
FIGS. 5A and 5B are drawings illustrating that ESC partial braking is linked and executed according to one form of the present disclosure.

FIG. 1 is a block diagram illustrating a configuration of an apparatus for improving turning performance of a vehicle according to one form of the present disclosure. FIG. 2 is a plan view illustrating a relationship of a force applied to a drive wheel according to one form of the present disclosure. FIG. 3 is a conceptual diagram illustrating that feedforward control is performed according to one form of the present disclosure. FIG. 4 is a conceptual diagram illustrating that feedback control is performed according to one form of the present disclosure. FIGS. 5A and 5B are drawings illustrating that ESC partial braking is linked and executed according to one form of the present disclosure. Referring to FIG. 1, the apparatus for improving the turning performance of the vehicle according to one form of the present disclosure may include a turning characteristic detection module 100 for detecting a turn situation based on vehicle information obtained from a sensor and calculating a required driving force to be implemented in the vehicle for a turning motion, a driving force estimation module 200 for estimating a limited driving force applicable to a drive wheel, which is performing the turning motion, using a normal force and a lateral force estimated based on the vehicle information, and a turning characteristic control module 300 for controlling to apply a braking force corresponding to a difference between the required driving force and the limited driving force to inhibit a wheel slip, when the required driving force is greater than the limited driving force.

The turning characteristic detection module 100 may be configured to detect whether the vehicle is in a turning motion state using vehicle information transmitted from various sensors provided in the vehicle and calculate the required driving force to be implemented by a driver for the turning motion, when it is determined that the vehicle is performing the turning motion.

To this end, as shown in FIG. 1, the turning characteristic detection module 100 may receive a value measured by each of a steering angle sensor, a steering torque sensor, a wheel speed sensor, a longitudinal acceleration sensor, a lateral acceleration sensor, and a yaw rate sensor from the steering angle sensor, the steering torque sensor, the wheel speed sensor, the longitudinal acceleration sensor, the lateral acceleration sensor, or the yaw rate sensor to obtain a variety of vehicle information capable of identifying a vehicle state generated by manipulation or the like of the driver who wants to perform the turning motion. Furthermore, the turning characteristic detection module 100 may receive an accelerator pedal signal applied by the driver or the like, while the vehicle for the turning motion accelerates or travels on a hill.

Thus, the turning characteristic detection module 100 may include a turning situation detecting device 110 for determining whether the vehicle is a turning motion state based on vehicle information about at least one of a steering torque, a steering angle, a yaw rate, or a lateral acceleration obtained from various sensors provided in the vehicle and a required driving force calculating device 120 for identifying the required driving force to be implemented in the vehicle based on vehicle information about at least one of an accelerator pedal signal manipulated by the driver who wants to perform the turning motion, a wheel speed, or a revolution per minute (RPM) of an engine/motor.

When an absolute value of data is greater than or equal to a predetermined value, the turning situation detecting device 110 may determine that the vehicle is in the turning motion state. The absolute value of data may include a steering torque and a steering angle generated as the driver manipulates the steering device, and a yaw rate and a lateral acceleration generated while the vehicle performs the turning motion, which are obtained to determine whether the vehicle performs the turning motion from various sensors provided in the vehicle.

Furthermore, the required driving force calculating device 120 may compare the accelerator pedal signal manipulated to generate a driving force for the turning motion, the wheel speed, and the RPM of an engine/motor, which are caused by the accelerator pedal signal, with data on a previously constructed map to identify the required driving force to be implemented to perform the turning motion.

To this end, the turning characteristic detection module 100 may calculate a value of a driving force capable of being actually implemented in the drive wheel based on the accelerator pedal signal and the wheel speed and the RPM of the engine/motor, which are caused according to the accelerator pedal signal, and may previously construct a map in which the value of the driving force is matched and stored with the accelerator pedal signal, the wheel speed, the RPM of the engine/motor, and the like, and may store the map in a storage such as a memory.

As such, because the required driving force calculating device 120 identifies the required driving force intended to be implemented by the driver using the map previously constructed based on measurement values obtained from various sensors provided in the vehicle, the turning characteristic detection module 100 may shorten a time taken to perform the calculation process to more quickly control a turning characteristic.

Furthermore, the driving force estimation module 200 may include a maximum driving force calculating device 210 for estimating a normal force applied to the drive wheel of the vehicle, which is performing the turning motion, and calculating a maximum driving force in the drive wheel using the normal force, a tire lateral force estimating device 220 for estimating a lateral force applied to the drive wheel using the lateral acceleration and the yaw rate obtained by the turning characteristic detection module 100 based on the normal force, and a limited driving force estimating device 230 for estimating a magnitude of the limited driving force capable of being actually implemented in the drive wheel based on the maximum driving force in the drive wheel and the lateral force currently applied to the drive wheel.

In this case, the maximum driving force calculating device 210 may estimate the normal force applied to a tire of the vehicle, which is performing the turning motion, particularly, the drive wheel that rotates using a driving force generated by electric power of the engine or the electric motor and may calculate the maximum driving force in each tire.

To this end, the maximum driving force calculating device 210 may estimate a value of the normal force applied to the drive wheel based on the longitudinal acceleration and the lateral acceleration obtained from a sensor provided in the vehicle by the turning characteristic detection module 100 and values of vehicle specifications, like Equation 1 below.

$$\tilde{F}_{z,FL} = \frac{l_r m_v}{2l}g - \frac{h_{cg} m_v}{2l}a_x - \frac{h_{cg} l_r m_v}{t_f l}a_y + \frac{h_{cg}^2 m_v}{t_f g l}a_x a_y$$

$$\tilde{F}_{z,FR} = \frac{l_r m_v}{2l}g - \frac{h_{cg} m_v}{2l}a_x + \frac{h_{cg} l_r m_v}{t_f l}a_y - \frac{h_{cg}^2 m_v}{t_f g l}a_x a_y$$

$$\tilde{F}_{z,RL} = \frac{l_f m_v}{2l}g + \frac{h_{cg} m_v}{2l}a_x - \frac{h_{cg} l_f m_v}{t_r l}a_y - \frac{h_{cg}^2 m_v}{t_r g l}a_x a_y$$

$$\tilde{F}_{z,RR} = \frac{l_f m_v}{2l}g + \frac{h_{cg} m_v}{2l}a_x + \frac{h_{cg} l_f m_v}{t_r l}a_y + \frac{h_{cg}^2 m_v}{t_r g l}a_x a_y$$

[Equation 1]

It is represented that Equation 1 above is calculated by dividing the normal force $\tilde{F}_z$ by normal forces applied to each of the left front wheel $\tilde{F}_{z,FL}$ and the right front wheel $\tilde{F}_{z,FR}$ and the left rear wheel $\tilde{F}_{z,RL}$ and the right rear wheel $\tilde{F}_{z,RR}$.

In such Equation 1 above, $m_v$ denotes the mass of the vehicle, $h_{cg}$ demotes the height of the center of mass of the vehicle, $l_f$ denotes the length from the front wheel to the center of mass of the vehicle, $l_r$ denotes the distance from the rear wheel to the center of mass of the vehicle, $t_f$ denotes the wheel track of the front wheel, $t_r$ denotes the wheel track of the rear wheel, and g denotes the acceleration of gravity. Furthermore, $a_x$ denotes the longitudinal acceleration of the vehicle and $a_y$ denotes the lateral acceleration of the vehicle.

As such, the maximum driving force calculating device 210 may estimate a normal force $\tilde{F}_z$ currently applied to the drive wheel based on data obtained based on the specifications of the vehicle and the longitudinal acceleration and the lateral acceleration of the vehicle which is performing the turning motion.

Furthermore, like Equation 2 below, the maximum driving force calculating device 210 may calculate a size of the Kamm's circle based on the estimated normal force $\tilde{F}_z$ to calculate a maximum driving force of the tire. The calculated radius $R^{kc}$ of the Kamm's circle may be a magnitude of the maximum driving force capable of being implemented in each tire. In Equation 2 below, $R^{kc}$ denotes the radius of the Kamm's circle, μ denotes the coefficient of friction, and $\tilde{F}_z$ denotes the estimated normal force.

$$R^{kc} = \mu \cdot \tilde{F}_z$$ [Equation 2]

Furthermore, the tire lateral force estimating device 220 may obtain a component applied in a lateral direction in the maximum driving force in each tire provided in the vehicle, which is performing the turning motion. To this end, like Equations 3 and 4 below, the tire lateral force estimating device 220 may derive lateral forces $F_{y,F}$ and $F_{y,R}$ in the center of the front wheel and the rear wheel of the vehicle using the lateral acceleration $a_y$ and the yaw rate differential value $\dot{\gamma}$ obtained by the turning characteristic detection module 100 and vehicle specification information ($m_v$: the mass of the vehicle, $h_{cg}$: the height of the center of mass of the vehicle, $l_f$: the length from the front wheel to the center of mass of the vehicle, or $l_r$: the distance from the rear wheel to the center of mass of the vehicle). In this case, Equation 3 below indicates a relationship equation between the lateral force and the lateral acceleration of the vehicle and a relationship equation between the lateral force and the yaw rate differential value of the vehicle, and Equation 4 below indicates the lateral force in the center of the front wheel and the lateral force in the center of the rear wheel, which are calculated using Equation 3 below.

$$F_{y,F} + F_{y,R} = m_v a_y$$ [Equation 3]

$$l_f F_{y,F} - l_r F_{y,R} = I_z \dot{\gamma}$$

$$F_{y,F} = \frac{m_v a_y l_r + I_z \dot{\gamma}}{l_f + l_r}, \quad F_{y,R} = \frac{m_v a_y l_f - I_z \dot{\gamma}}{l_f + l_r}$$ [Equation 4]

Furthermore, like Equation 5 below, the tire lateral force estimating device 220 may estimate tire lateral forces applied in the respective tires making up the front wheel and the rear wheel using the normal forces of the respective tires, which are estimated by the maximum driving force calculating device 210.

$$\tilde{F}_{y,FL} = F_{y,F} \cdot \frac{\tilde{F}_{z,FL}}{\tilde{F}_{z,FL} + \tilde{F}_{z,FR}}$$ [Equation 5]

$$\tilde{F}_{y,FR} = F_{y,F} \cdot \frac{\tilde{F}_{z,FR}}{\tilde{F}_{z,FL} + \tilde{F}_{z,FR}}$$

$$\tilde{F}_{y,RL} = F_{y,R} \cdot \frac{\tilde{F}_{z,RL}}{\tilde{F}_{z,RL} + \tilde{F}_{z,RR}}$$

$$\tilde{F}_{y,RR} = F_{y,R} \cdot \frac{\tilde{F}_{z,RR}}{\tilde{F}_{z,RL} + \tilde{F}_{z,RR}}$$

In this case, in Equation 5 above, the tire lateral force estimating device 220 may multiply the distribution ratio of a normal force $\tilde{F}_{z,FL}$ applied to the left tire to a normal force $\tilde{F}_{z,FL}+\tilde{F}_{z,FR}$ applied to both of the two tires (i.e., the left tire and the right tire) making up the front wheels by the tire lateral force $F_{y,F}$ applied to the center of the front wheels to estimate a lateral force $\tilde{F}_{y,FL}$ applied to the left tire in the lateral force $F_{y,F}$ applied to both the front wheels. Furthermore, the tire lateral force estimating device 220 may multiply the distribution ratio of a normal force $\tilde{F}_{z,FR}$ applied to the right tire in the normal force $\tilde{F}_{z,FL}+\tilde{F}_{z,FR}$ applied to both the two tires by the tire lateral force $F_{y,F}$ applied to the center of the front wheels to estimate a lateral force $\tilde{F}_{y,FR}$ applied to the right tire in the lateral force $F_{y,F}$ applied to both the front wheels.

Likewise, the tire lateral force estimating device 220 may estimate a lateral force $\tilde{F}_{y,RL}$ applied to the left tire and a lateral force $\tilde{F}_{y,RR}$ applied to the right tire from the tire lateral force $F_{y,R}$ applied to the center of rear wheels, by a distribution relationship between a normal force $\tilde{F}_{z,RL}+\tilde{F}_{z,RR}$ applied to both of the two tires (i.e., the left tire and the right tire) making up the rear wheels and a normal force $\tilde{F}_{z,RL}$ applied to the left tire and a normal force $\tilde{F}_{z,RL}$ applied to the right tire.

Furthermore, the limited driving force estimating device 230 may calculate a magnitude of the limited driving force applicable to the drive wheel using the maximum driving force calculated by the maximum driving force calculating device 210 and the lateral force estimated by the tire lateral force estimating device 220.

To this end, the limited driving force estimating device 230 may estimate a value of the limited driving force applicable to the drive wheel using a relationship between the maximum driving force and the lateral force as shown in FIG. 2 illustrating a relationship of a force applied to the drive wheel.

In this case, in FIG. 2, it may be seen that the radius $R^{kc}$ of the Kamm's circle indicating the size of the Kamm's circle is the maximum driving force calculated by the maximum driving force calculating device 210, that the lateral component of the maximum driving force is the lateral force $\tilde{F}_y$ estimated by the tire lateral force estimating device 220, and that the longitudinal component of the maximum driving force is the limited driving force $\overline{F}_x$.

Thus, the limited driving force estimating device 230 may calculate a magnitude of the limited driving force $\overline{F}_x$ applicable to the drive wheel using Equation 6 below.

$$\overline{F}_x = \sqrt{R_{min}^2 - \tilde{F}_y^2}$$ [Equation 6]

where $R_{min} = \min(R_{FL}^{kc}, R_{FR}^{kc})$

In this case, in Equation 6 above, $R_{min}$ is the radius of the Kamm's circle which is the maximum driving force, which denotes a smaller value between radii $R_{FL}^{kc}$ and $R_{FR}^{kc}$ of the Kamm's circle, which are calculated based on a normal force applied to each of the left tire and the right tire making up the front wheels, when the drive wheels are the front wheels.

In other words, one form of the present disclosure may be to inhibit a wheel slip capable of occurring when the vehicle makes a sharp turn while the vehicle accelerates or travels on a hill to improve turning performance. The wheel slip may occur as a normal force applied to the inner wheel in the drive wheel is reduced, as the load moves to an external side of the vehicle while the turning motion is performed. Thus, because of depending on the maximum driving force in the inner wheel having a reduced normal force in the drive wheel in estimating the limited driving force, the limited driving force estimating device 230 defines and indicates the maximum driving force as $R_{min}$ in Equation 6 above.

Furthermore, the turning characteristic control module 300 may include a feedforward controller 310 for comparing the required driving force with the limited driving force and controlling braking of the electric motor to apply a feedforward braking force corresponding to a difference between the required driving force and the limited driving force, when the required driving force is greater than the limited driving force.

Thus, the feedforward controller 310 may control the electric motor to additionally generate the feedforward braking force corresponding to the required driving force greater than the limited driving force to inhibit a driving force, which is greater than or equal to the limited driving force, from being applied to the inner wheel of the drive wheel, the normal force of which is reduced by load movement caused by the turning motion.

As such, the feedforward controller 310 may control to proactively inhibit an excessive required driving force generated by the electric motor by manipulation of the driver who wants to make a sharp turn while the vehicle accelerates or drives on a hill from being applied to the inner wheel of the drive wheel. The control inhibiting an excessive required driving force inhibit a wheel slip from being generated at the inner wheel in the drive wheel, thus inhibit understeer from being generated as the lateral force, and the driving force actually applied to the drive wheel are reduced.

As shown in FIG. 3, the feedforward controller 310 may additionally generate a feedforward braking force $F_{ff}$ corresponding to a difference between the limited driving force $\overline{F}_x$ and the required driving force $F_{x,drv}$ and may transmit the generated feedforward braking force $F_{ff}$ together with the required driving force $F_{x,drv}$ to a motor control ECU to control the electric motor.

In this case, as the required driving force is subtracted from the limited driving force in the expression shown in FIG. 3, because the operation result has a minus value, a braking force applied in a direction opposite to the required driving force is shown.

Thus, receiving the required driving force and the feedforward braking force together, the motor control ECU may control such that the final driving force implemented in the drive wheel is not greater than the limited driving force, thus inhibiting the wheel slip.

Furthermore, the turning characteristic control module 300 may further include a feedback controller 320 for obtaining a front wheel speed $v_f$ and a rear wheel speed $v_r$ transmitted from the wheel speed sensor provided in the vehicle to calculate a slip ratio $\lambda$ and additionally generating a feedback braking force $F_{fb}$ proportional to a magnitude of the slip ratio $\lambda$ when the slip ratio $\lambda$ is greater than or equal to a certain value.

Although the control for inhibiting the wheel slip is proactively performed by the feedforward controller 310, when the wheel slip occurs at the inner wheel of the drive wheel, the feedback controller 320 may perform control for additionally generating a braking force for reducing the wheel slip.

When the slip ratio, which is a difference between the front wheel speed and the rear wheel speed, is greater than or equal to the certain value, such a feedback controller 320 may recognize that the wheel slip occurs in the drive wheel and may perform control for generating a feedback braking force to reduce the wheel speed of the drive wheel. When the wheel slip occurs despite the braking control of the feedforward controller 310 due to inaccuracy of various estimation signals, a change in vehicle specifications, or the like, the feedback controller 320 may contribute to improving the wheel slip and an understeer state due to the wheel slip by the additionally generated feedback braking force.

In the expression shown in FIG. 4, it is represented that the feedback braking force $F_{fb}$ is determined to be proportional to the slip ratio $\lambda_{max}$ and the slip ratio gain K is applied as a proportional constant. Because the determined feedback braking force $F_{fb}$ is a braking force in a direction opposite to the required driving force of the driver, it is represented as a minus sign in the expression of FIG. 4.

Furthermore, because the wheel slip occurs as the tire slips in the drive wheel to which the driving force is applied, the slip ratio $$\lambda = \frac{v_f - v_r}{v_f}$$

may be obtained as shown in FIG. 4 based on the wheel speed in the front wheel, which is the drive wheel. It is shown that, because the tire with a large slip ratio may vary when the vehicle turns right and when the vehicle turns left, as the slip ratio generating the feedback braking force $F_{fb}$ is represented as $\lambda_{max}$, the feedback braking force $F_{fb}$ is generated using a slip ratio with a larger value between the left-wheel slip ratio $\lambda_L$ and the right-wheel slip ratio $\lambda_R$ shown in the drive wheels.

Furthermore, the turning characteristic control module 300 may further include a partial braking linkage controller 330 for controlling an electronic stability control (ESC) to perform partial braking and additionally apply a braking force to a wheel that slips, when the occurrence of the wheel slip is predicted at the inner wheel of the drive wheel because the required driving force generated by manipulation of the driver is greater than the limited driving force reduced due to load movement during turning.

The braking force generated by the partial braking linkage controller 330 together with the feedforward braking force generated by the feedforward controller 310 may contribute to inhibiting the occurrence of the wheel slip that may occur in the drive wheel of the vehicle, which is performing the turning motion.

Thus, as shown in FIG. 5A, the partial braking linkage controller 330 may control such that an additional braking force may be applied to the inner wheel located at an inner side in the drive wheel to additionally increase a normal force at the inner wheel, thus inhibiting the wheel slip from occurring at the inner wheel and inhibiting the vehicle from being under an understeer state.

As such, as shown in FIG. 5B, the partial braking performed by the partial braking linkage controller 330 may be implemented to have a difference in response time with the feedforward braking force (which is displayed as a drive motor braking force to be distinguished from a braking force of a partial braking device in FIG. 5B) in the feedforward controller 310, which performs proactive control, but may inhibit the wheel slip to take charge of a portion of a total required braking force to inhibit the vehicle from being under the understeer state, thus implementing a larger braking force.

Furthermore, the partial braking linkage controller 330 may distribute that the total required braking force is concentrated on control of the drive motor performed by the feedforward controller 310 to reduce a sense of alienation the driver feels during driving as an excessive braking force is applied to the drive motor, thus contributing to driving stability of the vehicle.

As such, simulation results performed to verify that the wheel slip in the inner wheel of the drive wheel while being controlled is inhibited by the turning characteristic control module 300 to improve the lateral force and that the vehicle from being under the understeer state is inhibited are represented as graphs shown in FIGS. 6 to 9.

Figure 6:
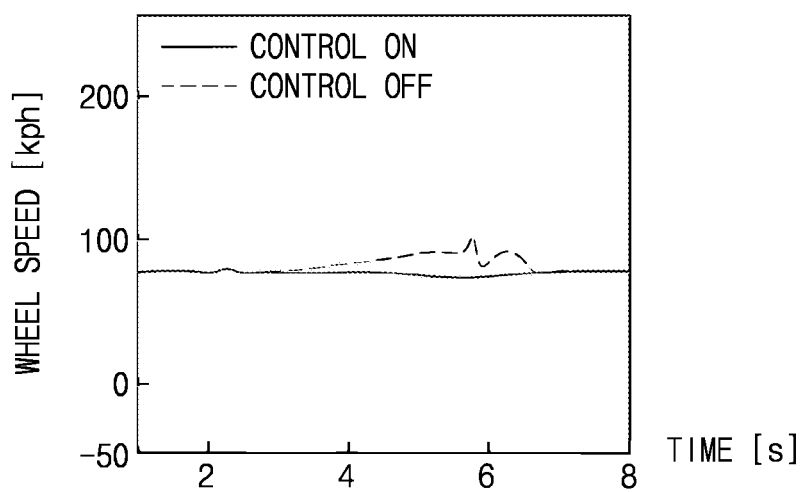
FIG. 6 is an exemplary graph illustrating a change in wheel speed of a vehicle by control of a turning characteristic control module according to one form of the present disclosure.
Figure 7:
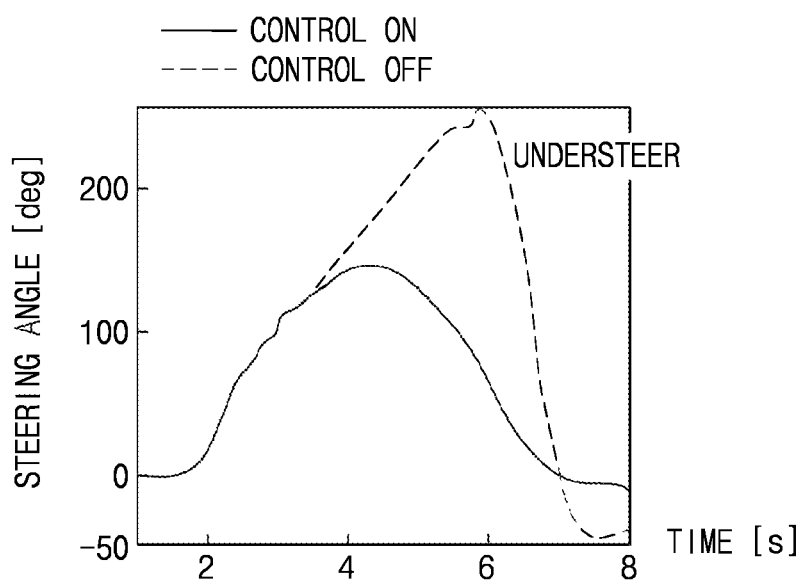
FIG. 7 is an exemplary graph illustrating a change in steering angle of a vehicle by control of a turning characteristic control module according to one form of the present disclosure.
Figure 8:
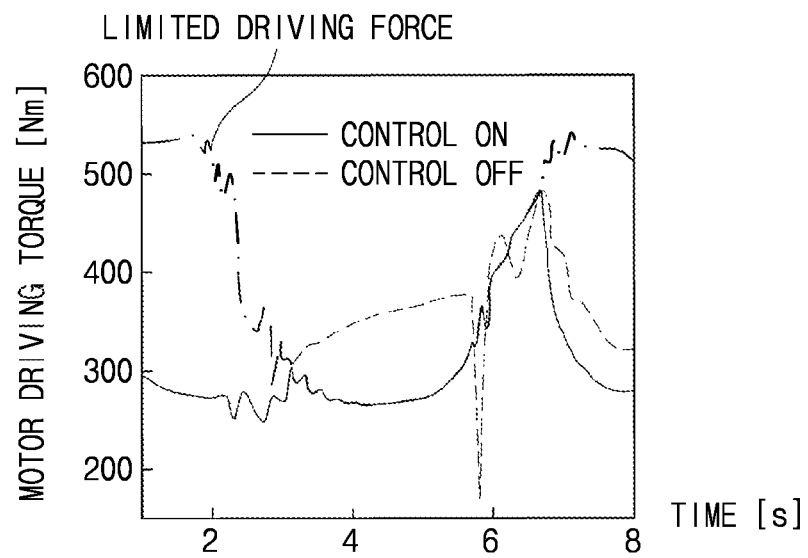
FIG. 8 is an exemplary graph illustrating a change in motor driving force of a vehicle by control of a turning characteristic control module according to one form of the present disclosure.
Figure 9:
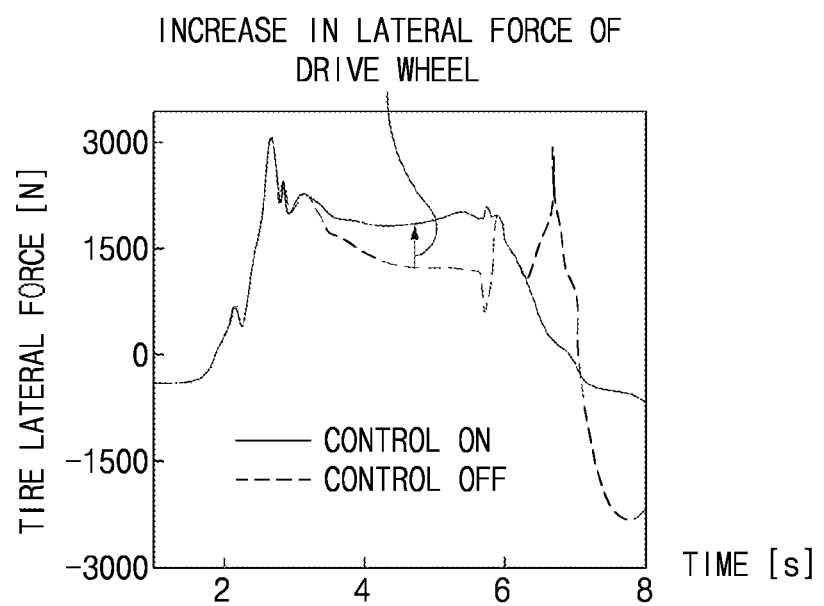
FIG. 9 is an exemplary graph illustrating a change in lateral force of a drive wheel by control of a turning characteristic control module according to one form of the present disclosure.

FIG. 6 is an exemplary graph illustrating a change in steering speed of a vehicle by control of a turning characteristic control module according to one form of the present disclosure. FIG. 7 is an exemplary graph illustrating a change in steering angle of a vehicle by control of a turning characteristic control module according to one form of the present disclosure. FIG. 8 is an exemplary graph illustrating a change in motor driving force of a vehicle by control of a turning characteristic control module according to one form of the present disclosure. FIG. 9 is an exemplary graph illustrating a change in lateral force of a drive wheel by control of a turning characteristic control module according to one form of the present disclosure. The solid line shown in FIGS. 6 to 9 indicates a vehicle (a control ON vehicle) in which control by a turning characteristic control module 300 of FIG. 1 is performed, and the dotted line in FIGS. 6 to 9 indicates a vehicle (a control OFF vehicle) in which the control is not performed. The simulation is set to use MATLAB/Simulink logic, apply CarSim dynamics/driver model, and turn left while holding a speed of 80 Kph on a hill of a slope of 12%.

As a result, as shown in in FIG. 6, unlike a control OFF vehicle, the wheel speed of the inner wheel of the drive wheel is increased over a certain time after a turning motion starts, and it may be verified in a control ON vehicle that the wheel speed of the driven inner wheel remains almost constant without a large change while the turning motion continues.

As the wheel speed of the driven inner wheel remains constant, as shown in FIG. 7, it may be verified that the steering angle manipulated by the driver is more stably changed in a remarkably small range in the control ON vehicle than in the control OFF vehicle. Thus, it may be verified that the understeer situation, in which the steering angle manipulated by the driver is excessively shown in the control OFF vehicle, does not occur in the control ON vehicle.

Furthermore, as shown in FIG. 8, when the driving force generated by the electric motor of the vehicle is compared with the limited driving force, which increases and decreases depending on the normal force of the driven inner wheel, unlike the control OFF vehicle in which the motor driving force greater than or equal to the limited driving force is generated after the turning motion starts, it may be verified that the motor driving force is not greater than the limited driving force while the turning motion is maintained in the control ON vehicle. Thus, it may be verified that it contributes to inhibiting the wheel slip and the understeer.

Furthermore, as shown in FIG. 9, it may be verified that the lateral force applied to the drive wheel is more increased in the control ON vehicle than in the control OFF vehicle and thus it may be verified that it is possible to perform a stable turning motion.

Next, a description will be given of a method for improving turning performance of a vehicle according to another form of the present disclosure with reference to FIGS. 10 and 11.

Figure 10:
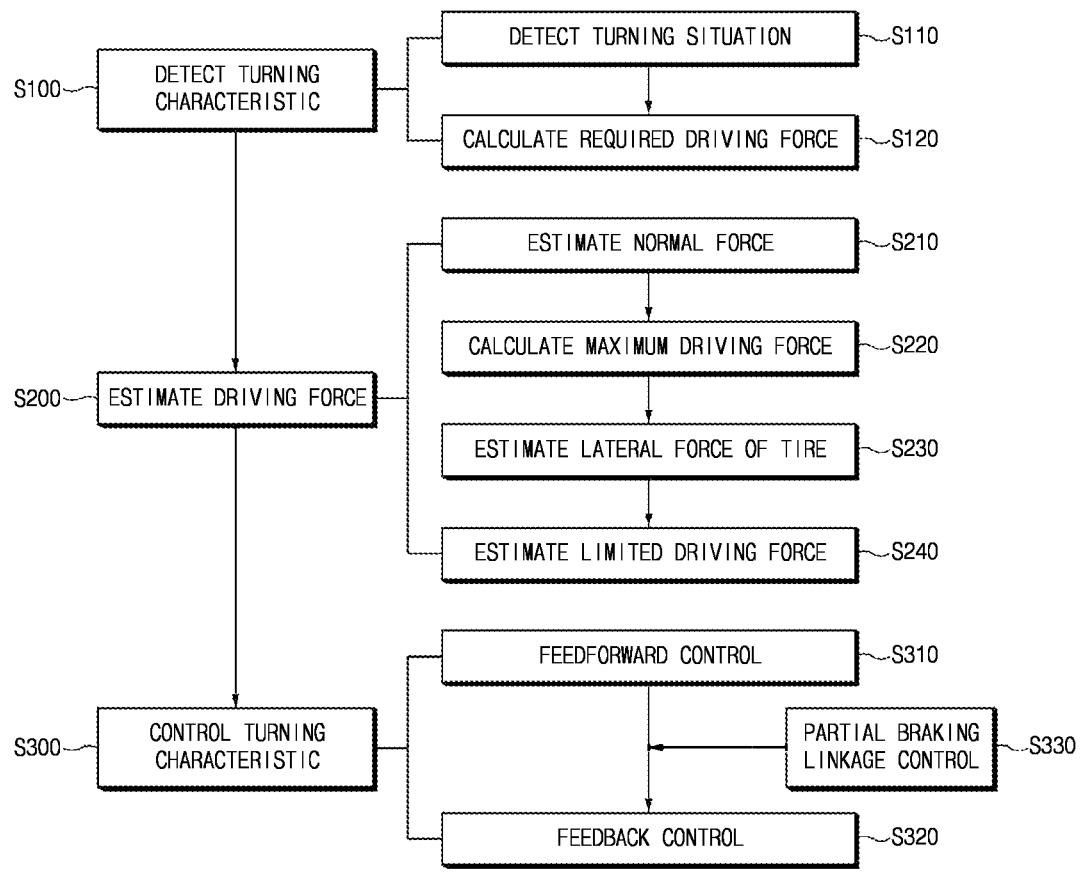
FIG. 10 is a drawing illustrating a method for improving turning performance of a vehicle according to another form of the present disclosure.
Figure 11:
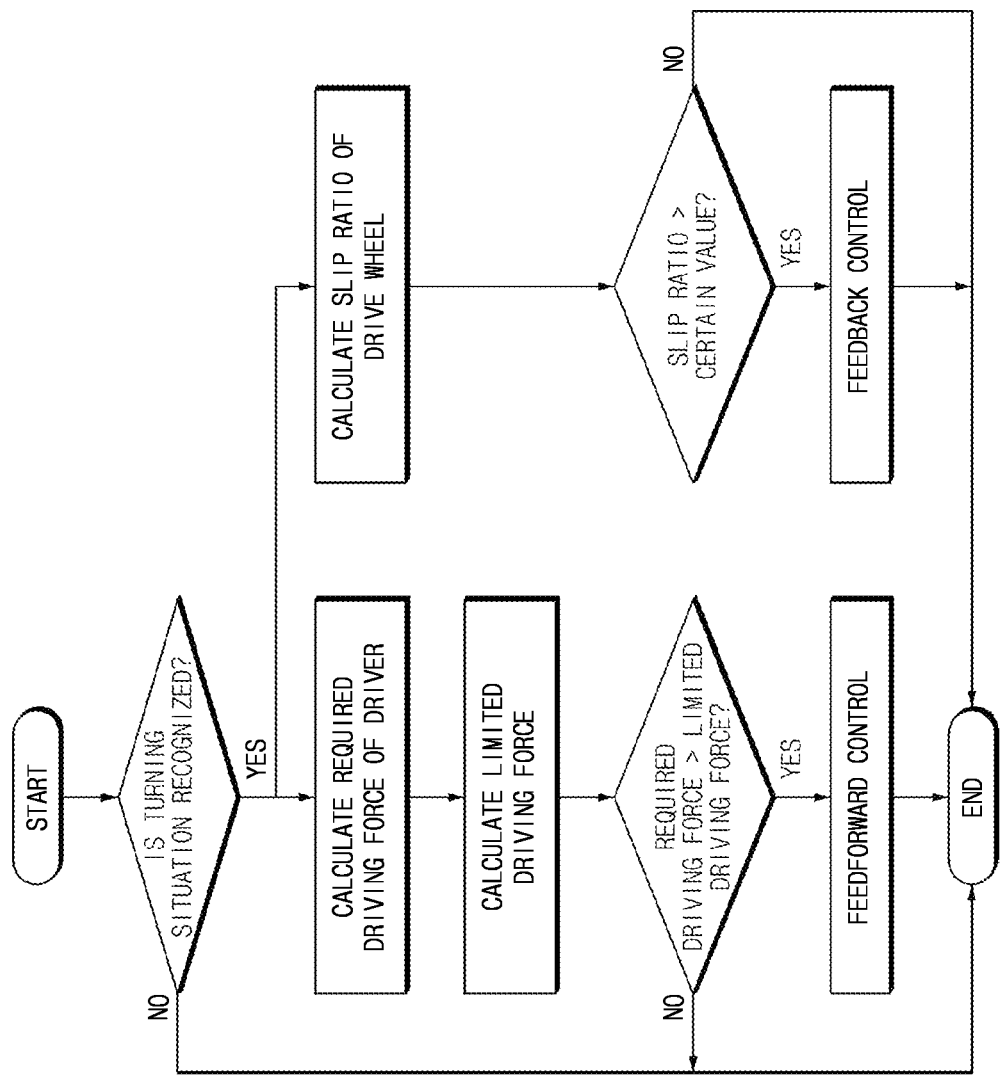
FIG. 11 is a flowchart illustrating an operation mechanism in which braking control for improving turning performance of a vehicle is executed according to another form of the present disclosure.

FIG. 10 is a drawing illustrating a method for improving turning performance of a vehicle according to another form of the present disclosure. FIG. 11 is a flowchart illustrating an operation mechanism in which braking control for improving turning performance of a vehicle is executed according to another form of the present disclosure.

Referring to FIG. 10, the method for improving the turning performance of the vehicle according to another form of the present disclosure may include detecting (S100) a turning situation based on vehicle information obtained from a sensor and calculating a required driving force to be implemented in the vehicle for a turning motion; estimating (S200) a normal force and a lateral force applied to the tire based on the vehicle information and estimating a limited driving force applicable to a drive wheel, which is performing the turning motion, using the estimated normal force and the estimated lateral force; and controlling (S300) to apply a braking fore corresponding to a difference between the required driving force and the limited driving force to inhibit a wheel slip, when the required driving force is greater than the limited driving force.

S100 may include determining (S110) whether the vehicle is a turning motion state based on vehicle information about at least one of a steering torque, a steering angle, a yaw rate, or a lateral acceleration obtained from various sensors provided in the vehicle and identifying (S120) the required driving force to be implemented in the vehicle based on vehicle information about at least one of an accelerator pedal signal manipulated by the driver, a wheel speed, or an RPM of an engine/motor.

When it is determined that an absolute value of at least one of data is greater than or equal to a predetermined value, 5110 may be to determine that the vehicle is in the turning motion state. Data may include a steering torque and a steering angle generated as the driver who wants to perform turning motion manipulates the steering device, and a yaw rate and a lateral acceleration caused while the vehicle performs the turning motion, which are obtained from various sensors provided in the vehicle.

Furthermore, S120 may be to compare an accelerator pedal signal manipulated to generate a driving force for the turning motion and a wheel speed and an RPM of an engine/motor, which are caused by the accelerator pedal signal, with data on a previously constructed map to identify the required driving force to be implemented for the turning motion by the driver. Thus, when the vehicle makes a sharp turn, because a pressure degree of the accelerator pedal is larger and the wheel speed and the RPM value due to the pressure degree are measured as large values, the value of the required driving force may be calculated as a large value.

Furthermore, S200 may include estimating (S210) a normal force applied to the drive wheel of the vehicle which is performing the turning motion based on the vehicle information and values of vehicle specifications, calculating (S220) a maximum driving force in the drive wheel using the normal force, estimating (S230) a lateral force applied to the drive wheel using the lateral acceleration and the yaw rate obtained from the vehicle information based on the normal force, and estimating (S240) a magnitude of the limited driving force capable of being actually implemented in the drive wheel based on the maximum driving force in the drive wheel and the lateral force currently applied to the drive wheel.

In this case, S210 may be to estimate, by a turning characteristic detection module 100, a value of the normal force applied to each tire of the vehicle including the drive wheel using Equation 1 above based on the longitudinal acceleration and the lateral acceleration of the vehicle, which are obtained from a sensor provided in the vehicle, and vehicle specification information.

Furthermore, S220 may be to calculate a size of the Kamm's circle based on the normal force to calculate the maximum driving force of the tire. To this end, S220 may be to calculate the radius of the Kamm's circle, which is calculated by multiplying the normal force by a friction coefficient, as the maximum driving force capable of being implemented while the normal force is applied to the ground.

Furthermore, S230 may be to obtain a component applied in a lateral direction in the maximum driving force in each tire provided in the vehicle, which is performing the turning motion. To this end, S230 may be to estimate a lateral force in the center of the front wheel and the rear wheel of the vehicle based on the lateral acceleration and the yaw rate differential value obtained by the turning characteristic detection module 100 and vehicle specification information. S230 may be to estimate a lateral force applied to each tire by distributing a lateral force applied to the center of the front wheel and the rear wheel using a distribution ratio of the normal force applied to each tire, which is obtained in S210.

Furthermore, S240 may be to estimate a component applied in a longitudinal direction in the maximum driving force as a limited driving force capable of being implemented in the drive wheel within the range of the maximum driving force. To this end, S240 may be to divide the maximum driving force into a horizontal component and a vertical component, put the horizontal component as the lateral force applied to each tire, which is calculated in S230, and calculate the vertical component as the limited driving force.

In this case, S240 may be to compare maximum driving forces respectively calculated for the left tire and the right tire of the drive wheels and calculate a limited driving force for the tire where the maximum driving force having a smaller magnitude is calculated. In other words, as the lateral force is reduced and the wheel slip occurs in the tire, the normal force of which is reduced while the load moves during the turning motion of the vehicle, the limited driving force may be estimated using a maximum driving force of the tire, which is calculated as a smaller value, among the tires of the drive wheels for turning characteristic control for inhibiting such wheel slip.

Furthermore, S300 may include comparing (S310) a magnitude of the required driving force with a magnitude of the limited driving force and controlling braking of the electric motor to generate a feedforward braking force corresponding to a difference between the required driving force and the limited driving force, when the required driving force is greater than the limited driving force.

S310 may be to allow the electric motor to additionally generate a feedforward braking force corresponding to a driving force greater than the limited driving force in the required driving force to inhibit the wheel slip from being generated as a driving force, which is greater than or equal to the limited driving force, is applied to the inner wheel of the drive wheel, the normal force of which is reduced by load movement caused by the turning motion.

In other words, S310 may be to additionally generate a braking force capable of attenuating a driving force, which is greater than or equal to the limited driving force, to inhibit an excessive required driving force generated by manipulation of the driver who wants to makes a sharp turn while the vehicle accelerates or drives on a hill from being applied to the drive wheel without change, thus proactively inhibiting the occurrence of the wheel slip due to the excessive driving force and the occurrence of understeer due to the wheel slip.

Furthermore, S300 may further include obtaining (S320) a front wheel speed and a rear wheel speed transmitted from a wheel speed sensor provided in the vehicle to calculate a slip ratio and control braking of the electric motor to additionally generate a feedback braking force proportional to a magnitude of the slip ratio, when the slip ratio is greater than or equal to a certain value.

When the wheel slip occurs although the control for inhibiting the wheel slip is proactively performed in S310, S320 may be to decrease the wheel slip to contribute to improving the turning performance of the vehicle.

Furthermore, S320 may be to calculate slip ratios for the left tire and the right tire in calculating the slip ratio based on the front wheel speed and the rear wheel speed and generate a feedback braking force based on the slip ratio with a larger value, thus performing suitable control capable of removing the wheel, slips which occur in the inner wheel in the drive wheel, when the vehicle turns left and when the vehicle turns right.

Furthermore, S300 may further include controlling (S330) an ESC to perform partial braking and additionally apply a braking force to a wheel which slips, when the occurrence of the wheel slip is predicted at the inner wheel in the drive wheel as the required driving force is greater than the limited driving force.

In partial braking in the ESC, which was performed in the existing technology, as the slip ratio calculated based on the wheel speed is greater than or equal to a certain value, because control is performed after the wheel slip occurs, response is somewhat degraded. However, in S330, the partial braking in the ESC may be controlled based on the result of comparing the magnitude of the required driving force with the magnitude of the limited driving force to improve response.

Furthermore, S330 may be performed in cooperation with S310 to distribute the dependence of only the feedforward braking force generated in S310, thus reducing a sense of alienation the driver feels during driving due to excessive braking control of the electric motor.

Forms of the present disclosure may allow the electric motor to additionally generate a braking force corresponding to a difference between a required driving force of the driver and a limited driving force applicable to the drive wheel which is performing a turning motion, thus inhibiting the vehicle from causing a wheel slip and being in an understeer state as the driving force greater than or equal to the limited driving force is applied to the drive wheel.

Furthermore, forms of the present disclosure may estimate a required driving force and a limited driving force and may control the electric motor to generate a braking force corresponding to a difference between the required driving force and the limited driving force, thus improving turning performance proactively before the wheel slip occurs in the drive wheel.

In addition, various effects ascertained directly or indirectly through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms disclosed herein.

What is claimed is:

1. An apparatus for improving turning performance of a vehicle, the apparatus comprising:
   at least one sensor configured to obtain vehicle information; and
   a processor configured to execute algorithm steps stored in a memory, the processor configured to:
   detect a turning situation based on the vehicle information,
   calculate a required driving force to be implemented in the vehicle for a turning motion based on an accelerator pedal signal manipulated by a driver,
   estimate a limited driving force applicable to a drive wheel based on a normal force and a lateral force, the processor being configured to i) calculate a radius of the Kamm's circle by multiplying the normal force by a friction coefficient and ii) determine the limited driving force such that a sum of the lateral force and the limited driving force is the radius of the Kamm's circle, and
   control and apply a braking force corresponding to a difference between the required driving force and the limited driving force to an electric motor to inhibit a wheel slip when the required driving force is greater than the limited driving force.

2. The apparatus of claim 1, wherein the processor is configured to:
   determine whether the vehicle is in a turning motion state using a first vehicle information including at least one of a steering torque, a steering angle, a yaw rate, or a lateral acceleration obtained from the at least one sensor provided in the vehicle.

3. The apparatus of claim 1, wherein the processor is configured to:
   compare the accelerator pedal signal, the wheel speed, and the RPM of the engine or the motor with data on a previously constructed map; and
   identify the required driving force to be implemented to perform the turning motion.

4. The apparatus of claim 1, wherein the processor is configured to:
   estimate the normal force applied to the drive wheel of the vehicle, and
   calculate a maximum driving force in the drive wheel using the normal force.

5. The apparatus of claim 4, wherein the processor is configured to estimate the normal force currently applied to the drive wheel based on data obtained based on specifications of the vehicle and a longitudinal acceleration and a lateral acceleration of the vehicle.

6. The apparatus of claim 1, wherein the processor is configured to:
estimate the lateral force applied to the drive wheel using a lateral acceleration and a yaw rate obtained by the processor based on the normal force; and
estimate a magnitude of the limited driving force based on a maximum driving force in the drive wheel and the lateral force currently applied to the drive wheel.

7. The apparatus of claim 1, wherein the processor is further configured to, when the required driving force is greater than the limited driving force:
compare a magnitude of the required driving force with a magnitude of the limited driving force; and
control braking of the motor and apply a feedforward braking force corresponding to a difference between the required driving force and the limited driving force.

8. The apparatus of claim 7, wherein the processor is further configured to control an electronic stability control (ESC) to perform partial braking and to additionally apply a braking force to a wheel that slips when the required driving force is greater than the limited driving force and occurrence of a wheel slip is predicted at an inner wheel in the drive wheel.

9. The apparatus of claim 1, wherein the processor is configured to:
obtain a front wheel speed and a rear wheel speed transmitted from a wheel speed sensor provided in the vehicle, calculate a slip ratio, and additionally generate a feedback braking force proportional to a magnitude of the slip ratio when the slip ratio is greater than or equal to a predetermined value.

10. A method for improving turning performance of a vehicle, the method comprising:
detecting, by a processor, a turning situation based on vehicle information obtained from at least one sensor;
calculating, by the processor, a required driving force to be implemented in the vehicle for a turning motion based on an accelerator pedal signal manipulated by a driver;
estimating, by the processor, a normal force and a lateral force applied to a tire based on the vehicle information;
estimating, by the processor, a limited driving force using the estimated normal force and the estimated lateral force, including i) calculating a radius of the Kamm's circle by multiplying the normal force by a friction coefficient and ii) determining the limited driving force such that a sum of the lateral force and the limited driving force is the radius of the Kamm's circle; and
controlling and applying, by the processor, a braking force corresponding to a difference between the required driving force and the limited driving force to a motor when the required driving force is greater than the limited driving force.

11. The method of claim 10, wherein calculating the required driving force includes:
determining whether the vehicle is in a turning motion state using a first vehicle information including at least one of a steering torque, a steering angle, a yaw rate, or a lateral acceleration obtained from the at least one sensor provided in the vehicle.

12. The method of claim 10, wherein identifying the required driving force includes:
comparing the accelerator pedal signal, the wheel speed, and the RPM of the engine or the motor with data on a previously constructed map; and
identifying the required driving force to be implemented for the turning motion by the driver.

13. The method of claim 10, wherein estimating the limited driving force includes:
estimating the normal force applied to the drive wheel of the vehicle based on the vehicle information and values of vehicle specifications.

14. The method of claim 13, wherein estimating the limited driving force further includes:
estimating a lateral force applied in a lateral direction to the drive wheel using a lateral acceleration and a yaw rate obtained from the vehicle information based on the normal force; and
estimating a magnitude of the limited driving force capable of being implemented in the drive wheel based on the maximum driving force in the drive wheel and the lateral force currently applied to the drive wheel.

15. The method of claim 14, wherein estimating the magnitude of the limited driving force includes estimating a component applied in a longitudinal direction in the maximum driving force as the limited driving force capable of being implemented in the drive wheel within a range of the maximum driving force.

16. The method of claim 14, wherein estimating the magnitude of the limited driving force includes:
comparing maximum driving forces calculated respectively for a first tire and a second tire; and
estimating the limited driving force for the first tire, which has a smaller magnitude of the maximum driving force than the second tire.

17. The method of claim 10, wherein controlling the braking force includes:
comparing a magnitude of the required driving force with a magnitude of the limited driving force; and
controlling braking of the motor and generating a feedforward braking force corresponding to a difference between the required driving force and the limited driving force when the required driving force is greater than the limited driving force.

18. The method of claim 17, wherein controlling the braking force includes:
when occurrence of the wheel slip is predicted at an inner wheel in the drive wheel and the required driving force is greater than the limited driving force,
controlling an electronic stability control (ESC);
performing partial braking; and
applying the braking force to a wheel that slips.

19. The method of claim 10, wherein controlling the braking force includes:
when the slip ratio is greater than or equal to a certain value,
obtaining a front wheel speed and a rear wheel speed transmitted from a wheel speed sensor provided in the vehicle;
calculating a slip ratio and controlling braking of the motor; and
generating a feedback braking force proportional to a magnitude of the slip ratio.

* * * * *